United States Patent Office 3,449,303
Patented June 10, 1969

3,449,303
POLYMERS OF PHOSPHATE ESTERS
John R. Caldwell and Edward H. Hill, Kingsport, Tenn., assignors to Eastman Kodak Company, Rochester, N.Y., a corporation of New Jersey
No Drawing. Filed June 23, 1966, Ser. No. 559,711
Int. Cl. C08f 15/16, 15/40; D01f 7/02
U.S. Cl. 260—80.71
5 Claims

ABSTRACT OF THE DISCLOSURE

Linear addition interpolymers derived from a compound having the formula:

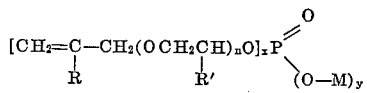

and at least one ethylenically unsaturated interpolymerizable compound selected from vinylidene halides, vinyl esters or the esters, amides or nitriles of acrylic or methacrylic acid, have been found to have improved dyeability and are useful for textiles.

---

This invention relates to novel addition polymers which can be dyed with basic dyes. More particularly, the invention is concerned with the preparation of novel monomers and the preparation of polymers therefrom. Specifically, the invention is directed to novel organophosphorus compounds, prepartion thereof and utilization of same in combination with polymerizable ethylenically unsaturated compounds to form novel addition polymers.

The textile industry is constantly seeking ways to provide an ever stronger affinity between textile fibers, yarns and fabrics and the dyes used to impart color thereto. In particular, a textile fiber has long been sought which exhibits a strong affinity for a broad class of dyes, such as the basic dyes (i.e. dyes formed by the combination of an organic base with a mineral or an organic acid).

In accordance with this invention there is provided a series of monomeric unsaturated allyloxy and allyloxyalkoxy phosphorus compounds which, in combination with a wide variety of ethylenically unsaturated compounds interpolymerizable therewith, form novel addition polymers which can be dyed with, and which exhibit a strong affinity for, basic dyestuffs.

It is therefore an object of this invention to provide novel polymeric materials which can be dyed with basic dyes, such polymeric materials being prepared by the interpolymerization of organophosphorus compounds with ethylenically unsaturated monomers interpolymerizable therewith.

A further object of the invention is to provide novel polymeric materials useful as basic dye additives.

In general, it has been found that the metal salts of certain unsaturated phopshoric acid esters to be described more fully hereinafter, when interpolymerized with ethylenically unsaturated compounds, form polymers having a strong affinity for basic dyes.

The monomers

The monomeric compounds are represented by the structural formula

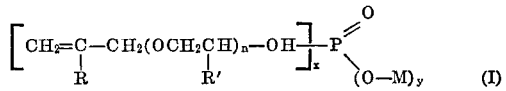

wherein:
R and R′ represent hydrogen or methyl;
M represents ammonium (i.e. NH$_4$) or an alkali metal; i.e. a metal selected from Group IA of the Periodic Chart of the elements and including lithium, sodium and potassium;
$n$ represents zero or an integer from 1 to 10;
$x$ represents the integers 1 or 2;
$y$ represents the integers 1 or 2; and
$x+y=3$.

Representative compounds having the structure of Formula I include, for example, sodium bis(allyl phosphate), sodium bis(allyloxyethoxy phosphate), sodium bis(allyloxyethoxyethoxy phosphate); potassium bis-(methallyl phosphate), potassium bis(methallyloxyethoxy phosphate), potassium(methallyloxyethoxyethoxy phosphate), sodium bis(allyloxyethoxyethoxyethoxy phosphate), disodium(allyl phosphate), dipostassium(methallyl phosphate), dipotassium(allyloxyethoxy phosphate), dipotassium(methallyloxyethoxyethoxy phosphate) and the like. Obviously, the corresponding higher or lower homologous compounds are within the scope of the invention, as are the corresponding lithium and ammonium salts.

The alloyloxy and allyloxyalkoxy phosphates and homologs thereof, within the scope of Formula I, are prepared by the reaction of phosphorus pentoxide with the appropriate allyl or allylalkoxy alcohols represented by the formula

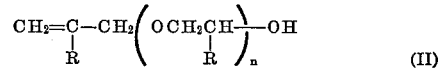

wherein R, R′ and $n$ are defined above.

The preparation of allyl acid phosphates is described in Compt. Rend., 170, 1062 (1920); Bull. Soc. Chim., 13, 885 (1895) and 15, 932 (1896); Compt. Rend., 122, 69 (1895); Bull. Soc. Chim., (3) 19, 883 (1898).

Thus a schematic representation of the preparation of the phosphate esters may be represented as follows:

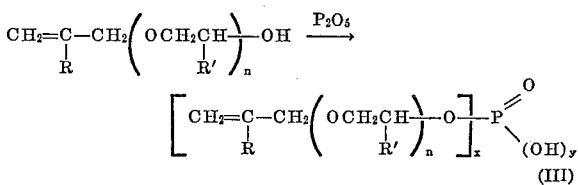

wherein R, R′, $n$, $x$ and $y$ are defined above. The compound of Formula III is then contacted with an alkaline reagent such as an alkali metal hydroxide to obtain the alkali metal salts represented by Formula I.

The P$_2$O$_5$ is conveniently used in the form of polyphosphoric acid. The compound (II) is added with stirring and cooling to the polyphosphoric acid. This method is especially useful for preparing compounds of Formula III where $x=1$.

The allyl alcohols used in the preparation of the allyloxy phosphate compounds are commercially available and may be prepared, for example, by hydrolysis of allyl chloride with dilute caustic, by isomerization of propylene oxide or by dehydration of propylene glycol.

The allylalkoxy alcohols used to prepare the allyloxyalkoxy phosphate compounds are made by treating allyl or methallyl alcohol with ethylene oxide or propylene oxide in the presence of a suitable catalyst such as an alkali metal alkoxide. A temperature of about 20° to 100° is used. The general procedure is well known in the art, the reaction being as follows:

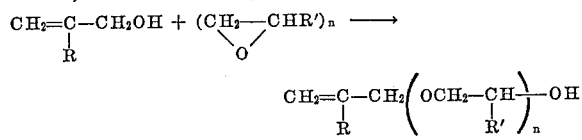

The degree of esterification (i.e. the value of $x$ in Formula III is primariy dependent on the ratio of the equivalents of the reactants, although it will also be influenced by specific reactants and reaction conditions. Generally, a ratio of about 1:1 (alcohol:$P_2O_5$) is used to prepare monoesters whereas a ratio of about 2:1 (alcohol:$P_2O_5$) is used to prepare diesters although a somewhat higher or lower ratio may be used, depending on conditions. The phosphorus pentoxide is preferably slowly added to the allyl alcohol or allylalkoxy alcohol at 0° and the temperature of the reaction mixture is then raised to a value within the range of about 20° C. to about 40° C., although a temperature of about 30° C. is preferred. The reaction may be carried out at ambient pressure and is usually completed in approximately 1 to 4 hours.

The novel polymers

The novel polymers of the invention are prepared by interpolymerizing the monomeric compounds described above in admixture with at least one monoethylenically unsaturated compound interpolymerizable therewith.

Representative monoethylenically unsaturated compounds which are utilized in the practice of the invention include unsaturated acid esters, e.g. methyl acrylate, ethyl acrylate, butyl methacrylate, methyl methacrylate; olefinic dibasic acid derivatives, e.g. maleates, maleamides, maleamates, maleimides; esters, amides and ester-amides of fumaric, itaconic, citraconic acid and the like, e.g. diethyl fumarate; vinyl esters; vinyl ethers; vinyl ketones; vinyl aromatics and derivatives thereof, e.g. styrene, methyl styrene, divinyl benzene, p-acetaminostyrene, α-acetoxystyrene; unsaturated nitriles, e.g. acrylonitrile, methacrylonitrile; vinyl halides, e.g. vinyl chloride, vinyl fluoride, vinyl bromide, vinylidene chloride, vinylidene fluoride, tetrafluoroethylene, chlorotrifluoroethylene; olefins, e.g. ethylene, propylene, butene, isobutylene; amides, e.g. the N-alkyl amides and N,N-dialkyl amides of unsaturated acids such as acrylic and methacrylic acid; N-vinyl imides; N-vinyl lactams; isopropenyl acetate and the like, either alone or in admixture. Obviously, the invention is not limited to the ethylenically unsaturated compounds which are listed above for solely illustrative purposes. As will be evident to those skilled in the art, the scope of this invention encompasses the utilization of any polymerizable, ethylenically unsaturated compound which will interpolymerize with the described unsaturated phosphate esters.

The interpolymers of the invention may contain from about 2 to about 30 percent by weight of the phosphate monomer and, correspondingly, from about 98 to 70 percent by weight of at least one ethylenically unsaturated compound interpolymerizable therewith, depending on the intended utility of the polymer. For example, only small amounts of the phosphate monomer, i.e. from about 1 to about 10 percent by weight, are required in interpolymers which are fiber-forming. Such interpolymers have an I.V. (dimethylformamide) of 0.8 to 1.6. Larger amounts of the phosphate monomer, e.g. from about 10 to about 30 percent by weight are required in interpolymers which are not fiber-forming but which are useful as dye additives when imparting color to other fibers.

Preferred interpolymers are formed from the interpolymerization of the appropriate amounts of the phosphate monomers with one or more ethylenically unsaturated compounds such as acrylonitrile, methyl acrylate, methyl methacrylate, vinyl acetate, vinylidene chloride, N-isopropylacylamide and N,N-dimethylacrylamide. For example, a preferred interpolymer comprises from about 2 to about 10 percent by weight of interpolymer units derived from the phosphate monomer with the remaining interpolymer units being derived from acrylonitrile. A further preferred interpolymer comprises from about 2 to about 10 percent by weight of interpolymer units derived from the phosphate monomer, at least about 45 percent by weight of units derived from acrylonitrile and the remaining units being derived from an interpolymerizable compound set forth above. Another preferred interpolymer comprises from about 2 to about 10 percent of interpolymer units derived from the phosphate monomer with the remaining units being derived from an ester or amide of acrylic or methacrylic acid.

The interpolymerization of phosphates defined by Formula I, above, and one or more of the ethylenically unsaturated compounds illustrated above may be carried out by mass, bulk, solution or emulsion polymerization. A two-phase reaction medium of water and an organic diluent may also be used. The interpolymerization occurs readily in conventional inert organic diluents such as the lower alcohols, e.g. methanol, ethanol; ketones, e.g. acetone; esters, e.g. ethyl acetate; ethers, e.g. dioxane, glycol monoethers; amides, e.g. dimethylformamide and carbonates, e.g. ethylene carbonate.

Conventional emulsifying or dispersing agents may be used. Representative dispersing agents include sodium dodecyl sulfate, sodium octadecyl sulfate, sodium dodecyl benzene sulfonate, soaps, sulfonated mineral oil and the like.

Free radical polymerization catalysts suitable for use in the reaction of the above-described monomers with the novel phosphate esters of the invention include the alkali metal persulfates e.g. ammonium, sodium or potassium persulfate; peroxides, e.g. hydrogen peroxide; alkali metal perborates, e.g. sodium perborate; organic peroxides, e.g. benzoyl peroxide, acetyl peroxide, t-butyl hydroperoxide; azobis(isobutyronitrile) and the like. The catalyst concentration is conventional and is usually within the range of about 1% to about 3% based on the total weight of the reactants.

The polymerization may be carried out at a pressure within the range of about 15 to 100 p.s.i. and at temperatures of from about 0° C. to 120° C. although the preferred temperature is from about 40° C. to about 65° C. The reaction is ordinarily completed within a period of from about 15 to 30 hours.

The following examples will serve to more clearly illustrate the novel interpolymers of the invention and the preparation thereof. It is to be understood, however, that the examples are merely illustrative and are not to be construed as a limitation of the scope of the invention.

Example 1

Preparation of disodium(allyloxyethoxy phosphate).

The general procedure shown in I.E.C., 34, 20 (1942) was used. One mole of $P_2O_5$ was superimposed in dry dioxane and the mixture was stirred at 10–15° while 2 moles of allyloxyethanol were slowly added. The mixture was then allowed to warm up to room temperature while being stirred. One mole of sodium carbonate was added as a 10% solution in water. The water and dioxane were removed in vacuum at 50–60°. The produce was a crystalline solid.

In accordance with the procedure of Example 1, a large number of phosphate monomers were prepared, representative examples of which are listed in the table below, together with the allyl alcohol or allylalkoxy alcohol from which they were derived.

TABLE

| Ex. | Alcohol | Product |
|---|---|---|
| 2 | $CH_2=CHCH_2(OCH_2CH_2)_2OH$ | $CH_2=CHCH_2(OCH_2CH_2)_2-O-P(=O)(ONa)_2$ |
| 3 | $CH_2=CHCH_2(OCH_2CH_2)_3OH$ | $CH_2=CHCH_2(OCH_2CH_2)_3-O-P(=O)(ONa)_2$ |
| 4 | $CH_2=CHCH_2(OCH_2CH_2)_2OH$ | $[CH_2=CHCH_2(OCH_2CH_2)_2-O-]_2-P(=O)ONa$ |
| 5 | $CH_2=C(CH_3)-CH_2OCH_2CH_2OH$ | $CH_2=C(CH_3)-CH_2OCH_2CH_2-O-P(=O)(OK)_2$ |
| 6 | $CH_2=CHCH_2OH$ | $[CH_2=CHCH_2-O-]_2-P(=O)OK$ |
| 7 | $CH_2=C(CH_3)-CH_2OCH_2CH_2OH$ | $CH_2=C(CH_3)-CH_2OCH_2CH_2-O-P(=O)(OLi)_2$ |
| 8 | $CH_2=C(CH_3)-CH_2-O-CH_2CHOH(CH_3)$ | $CH_2=C(CH_3)-CH_2-O-CH_2-CH(CH_3)-O-P(=O)(OLi)_2$ |
| 9 | $CH_2=CHCH_2(OCH_2CH_2)_2OH$ | $CH_2=CHCH_2(OCH_2CH_2)_2-O-P(=O)(OLi)_2$ |

The following examples illustrate the preparation of representative interpolymers of the invention.

Example 10

The following materials were placed in a pressure bottle and tumbled at 50° for 18 hours:

| | | |
|---|---|---|
| Acrylonitrile | g | 46.5 |
| Methyl acrylate | g | 1.5 |
| Disodium(allyloxyethoxy phosphate) | g | 2.0 |
| Water | ml | 200 |
| Ammonium persulfate | g | 0.5 |
| Sodium bisulfite | g | 0.3 |
| Sodium lauryl sulfate | g | 2.0 |

The product was isolated by filtration and washed well with water. It weighed 48.7 g. and a phosphorus analysis showed that the polymer contained 3.2% of the phosphate. The polymer was dissolved in dimethylformamide and wet-spun into fibers which dyed deeply with basic dyes. A copolymer having the composition 93 parts acrylonitrile-7 parts methyl acrylate prepared in the same way dyed only fair with basic dyes.

Example 11

The following materials were placed in a 3 liter flask equipped with a sweep stirrer and an inlet and outlet for nitrogen and stirred at 45° for 20 hours:

| | G. |
|---|---|
| Acrylonitrile | 368 |
| Disodium(allyloxyethoxy phosphate) | 20.0 |
| Methyl acrylate | 12.0 |
| Dimethylformamide | 800 |
| Ammonium persulfate | 1.0 |

A very viscous dope was obtained which was dry-spun into fibers which had a strong affinity for basic dyes.

Example 12

The following materials were placed in a pressure bottle and tumbled at 60° for 20 hours:

| | | |
|---|---|---|
| Methyl acrylate | g | 10 |
| Disodium(alloyloxyethoxyethoxy phosphate) | g | 10 |
| Acetone | ml | 100 |
| Water | ml | 30 |
| Acetyl Peroxide | g | 0.2 |

A hazy, viscous dope was obtained which was added to a solution of secondary cellulose acetate to give a composition of 90 parts cellulose acetate-10 parts addition polymer. This dope was dry-spun to give fibers which dyed well with basic dyes.

Example 13

Using the method of Example 10, a copolymer was prepared having a composition 90% acrylonitrile-5% methyl acrylate - 5% dipotassium(methallyloxyethoxy phosphate). The polymer was dissolved in gamma-butyrolacetone and wet-spun into fibers having a strong affinity for basic dyes.

Example 14

Using the method of Example 11, a copolymer was prepared having the composition 92% acrylonitrile-4% vinyl acetate - 4% dilithium(methallyloxyethoxy phosphate). The resulting dope was dry-spun into fibers which dyed deeply with basic dyes.

Eighty-four parts of the copolymer and 16 parts of poly(N-isopropylacrylamide) were dissolved in acetone and dry-spun. The fibers had excellent affinity for basic dyes, disperse dyes and premetallized dyes.

Example 15

The following materials were placed in a pressure bottle and tumbled at 50° for 24 hours:

| | |
|---|---|
| Acrylonitrile _____ g__ | 50 |
| Vinylidene chloride _____ g__ | 46 |
| Disodium(allyloxyethoxyethoxyethoxy phosphate) _____ g__ | 4.0 |
| Tert-butyl alcohol _____ ml__ | 300 |
| Water _____ ml__ | 300 |
| Ammonium persulfate _____ g__ | 1.0 |
| Azobisisobutyronitrile _____ g__ | 1.0 |

The polymer precipitated as a white powder which was filtered and washed with water and isopropyl alcohol. It weighed 93 g. and a phosphorus analysis showed that it contained 3.3% of the phosphate. The polymer was dissolved in acetone and dry-spun into fibers having a strong affinity for basic dyes.

Example 16

Using the method of Example 10, a copolymer was prepared having the composition 75% acrylonitrile-25% dilithium[methallyloxy(2-methylethoxy)phosphate]. The polymer was dissolved in dimethylformamide and added to a dope of poly(93 acrylonitrile-7 methyl acrylate) in dimethylformamide to give a final composition containing 5% of the phosphate. Fibers were wet-spun from the dope which had excellent dyeability with basic dyes.

Example 17

Using the method of Example 11, a polymer was made having the composition 90% acrylonitrile-4% vinyl acetate-6% of a 2:1 mixture of disodium(allyloxyethoxyethoxy phosphate):sodium bis - (allyloxyethoxyethoxy phosphate). Fibers were wet-spun from the dimethylformamide dope which had excellent affinity for basic dyes.

Example 18

The following materials were placed in a pressure bottle and tumbled at 60° for 18 hours:

| | |
|---|---|
| Acrylonitrile _____ g__ | 18 |
| N-isopropylacrylamide _____ g__ | 1.0 |
| 2:1 mixture of dipotassium(allyl phosphate) and potassium bis(allyl phosphate) _____ g__ | 1.0 |
| Water _____ ml__ | 200 |
| Sodium perborate _____ g__ | 0.2 |

The polymer precipitated as a grainy, white powder which was filtered off and washed with water. The product weighed 19.2 g. after drying. It was dissolved in dimethylsulfoxide and wet-spun into fibers which dyed well with basic dyes.

Example 19

Using the method of Example 12, a copolymer was prepared having the composition 70% methyl methacrylate-30% dilithium-(allyloxyethoxyethoxy phosphate). The polymer could be dissolved in ethylene carbonate and it was mixed with a dope of poly(92 acrylonitrile-8 isopropenyl acetate) in ethylene carbonate to give a final composition containing 8% of the phosphate. Fibers were wet-spun from this dope which dyed very well with basic dyes.

Example 20

Example 1 was repeated except that monosodium allyl phosphate was used in place of the allyloxyethyl derivative. Fibers made from the copolymer dyed well with basic dyes.

Example 21

Using the procedure described in Example 1, a copolymer was made from 85 g. acrylonitrile, 6 g. of N,N-dimethylacrylamide and 9 g. of monolithium allyl phosphate. Fibers made from the copolymer dyed well with basic dyes.

Example 22

Using the procedure described in Example 1, a copolymer was made from 93 g. of acrylontrile and 7 g. of monosodium methallyl phosphate. Fibers made from the composition dyed well with basic dyes.

Example 23

A copolymer was made from 80 g. of N-isopropylacrylamide and 20 g. of monosodium allyloxyethyl phosphate. One part of the copolymer and 3 parts of polyacrylonitrile were dissolved in dimethylformamide. Fibers spun from the blend dyed well wth basic dyes, dispersed dyes and premetallized dyes.

Example 24

A copolymer was made from 85 g. of acrylonitrile and 15 g. of

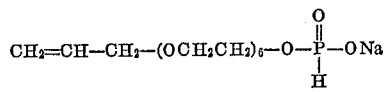

Analysis showed that the copolymer contained 10–11% of the phosphate ester salt. Fibers made from the composition dyed well with basic dyes.

As stated hereinbefore, the invention provides interpolymers which may contain from about 3% to about 30% by weight of the phosphate esters described above. Interpolymers formed by the practice of the invention may be either fiber-forming or nonfiber-forming. The fiber-forming polymers, by virtue of their distinctive structure exhibit a strong affinity for basic dyes. The nonfiber-forming polymers are useful as additives to nonphosphate-containing polymers which are fiber-forming whereby such fiber-forming polymers exhibit an increased affinity for basic dyes.

In addition to having utility as indicated above, it is apparent that yarns may be formed from the interpolymer fibers of this invention and the textiles may be woven from such yarns. Further, it will be apparent to those skilled in the art that coatings and films may be prepared by conventional procedures from the interpolymers of the invention.

Obviously, many modifications of the present invention are possible in the light of the above teachings. It is therefore to be understood that, within the scope of the appended claims, the invention may be practiced otherwise than as specifically described.

We claim:

1. A linear, addition interpolymer comprising from 2 to 30% by weight of units derived from a compound having the formula:

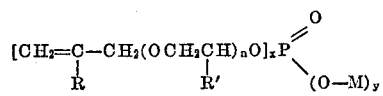

wherein

R=hydrogen or methyl;
R'=hydrogen or methyl;
M=NH$_4$ or an alkali metal;
n=zero or an integer from 1 to 10;
x and y=the integers 1 or 2; and
x+y=3 and from 98 to 70% by weight of units derived from at least one ethylenically unsaturated interpolymerizable compound selected from the group consisting of vinylidene halides, vinyl esters or the esters, amides, or nitriles of acrylic or methacrylic acid.

2. An interpolymer as defined in claim 1 comprising from about 2 to about 10 percent by weight of units derived from a compound having the formula defined therein, at least about 45 percent by weight of units derived from acrylonitrile and the remaining units derived from an ethylenically unsaturated interpolymerizable compound selected from the group consisting of vinylidene halides, vinyl esters or the esters, or amides of acrylic or methacrylic acid.

3. An interpolymer as defined in claim 2 wherein said ethylenically unsaturated compound is a member selected from the group consisting of methyl acrylate, methyl methacrylate, vinyl acetate, vinylidene chloride, N-isopropyl-acrylamide or N,N-dimethylacrylamide.

4. An interpolymer as defined in claim 1 comprising from about 2 to about 10 percent by weight of units derived from a compound having the formula defined therein and from about 98 to about 90 percent by weight of units derived from acrylonitrile.

5. An interpolymer as defined in claim 1 wherein said ethylenically unsaturated compound is selected from the group consisting of acrylonitrile, methyl acrylate, methyl methacrylate or N-isopropylacrylamide.

References Cited
UNITED STATES PATENTS 2,394,829   2/1946   Whitehill et al. _____ 260—461

JAMES A. SEIDLECK, *Primary Examiner.*

STANFORD M. LEVIN, *Assistant Examiner.*

U.S. Cl. X.R.

8—55; 260—17, 63, 78.5, 80.3, 80.71, 85.7, 85.5, 86.1, 87.7, 87.5, 88.1

PO-1050
(5/69)

UNITED STATES PATENT OFFICE
CERTIFICATE OF CORRECTION

Patent No. 3,449,303                    Dated  June 10, 1969

Inventor(s)  John R. Caldwell; Edward H. Hill

It is certified that error appears in the above-identified patent and that said Letters Patent are hereby corrected as shown below:

Column 1, formula:

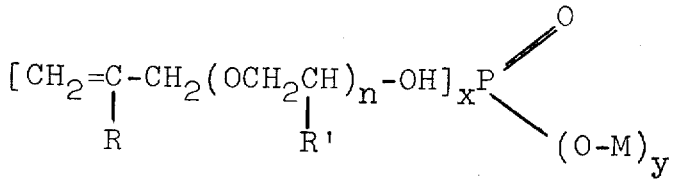

should be

-- 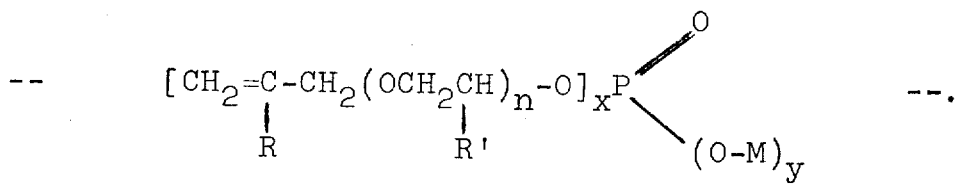 --.

Column 2, line 19, "dipostassium" should be --dipotassium--; line 29, "allyl" should be --allyl- --.  Column 3, line 17, "primariy" should be --primarily--.  Column 4, line 63, "superimposed" should be --suspended--; line 69, "produce" should be --product--.  Column 6, line 43, "alloyloxyethoxy-ethoxy" should be --allyloxyethoxyethoxy--; line 59, "a" should be --the--.  Column 8, line 2, "acrylontrile" should be --acrylonitrile--; line 20, formula:

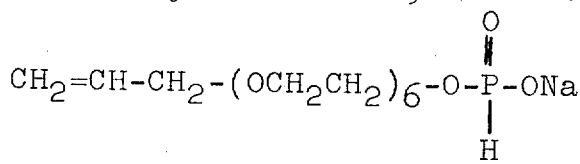

should be

-- 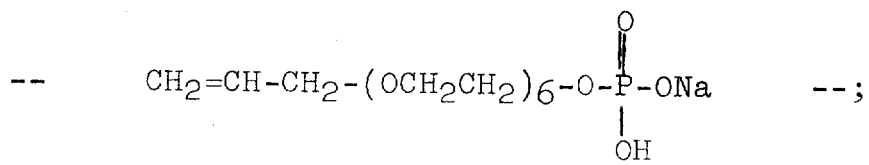 --;

line 39, "the" should be --that--.

SIGNED AND SEALED

MAY 5 1970

(SEAL)
Attest:

Edward M. Fletcher, Jr.
Attesting Officer

WILLIAM E. SCHUYLER, JR.
Commissioner of Patents